Patented July 14, 1942

2,289,520

UNITED STATES PATENT OFFICE 2,289,520

PROCESS FOR TREATING MATERIALS

Frank H. Reichel and Augustus E. Craver, Fredericksburg, Va., assignors to Sylvania Industrial Corporation, Fredericksburg, Va., a corporation of Virginia No Drawing. Application March 22, 1939, Serial No. 263,415. In Great Britain March 24, 1938

6 Claims. (Cl. 18—54)

The invention relates in general to the manufacture of nitrocellulose products and, in particular, to a process for the denitration of nitrocellulose products.

Heretofore, it has been customary in the manufacture of nitrocellulose products, such as filaments, films, tubing, and the like to carry out the denitration discontinuously as in the batch. For example, artificial silk is frequently denitrated while wound upon a spool or in the form of a skein. It is further customary in such batch treatment to use a relatively high temperature such as 20–40° C. and a relatively high concentration of reducing agent such as above a 5 per cent aqueous solution of sodium hydrosulfide. Despite attempts to circulate the treating solution, the nitrocellulose product is frequently locally overheated and thus embrittled. Moreover, the nitrocellulose tends to become degraded by the action of the sodium polysulphide which is produced during the denitration reaction.

It is a general object of the invention to carry out the denitration of elongate articles of nitrocellulose in a rapid and continuous manner whereby to reduce costs and expedite the manufacture of such articles.

It is a specific object of the invention to effect the denitration of nitrocellulose in such a manner as to produce a uniform product.

Other objects of the invention will in part be obvious and will in part appear hereinafter.

According to the present invention, the disadvantages of the prior practice can be avoided and products having improved properties and characteristics can be obtained by forming products from nitrocellulose by "wet" or "dry" methods and denitrating the product in a continuous manner while the product is in a swollen gel state, employing a relatively low concentration of the reducing agent, such as an alkali hydrosulphide at a relatively low temperature, as compared to prior practice. The expression "swollen gel state" designates a nitrocellulose product which contains an amount of swelling agent in excess of that which could be tolerated in a commercial dry product.

The invention accordingly comprises the several steps and the relation of one or more of such steps with respect to each of the others thereof, which will be exemplified in the process hereinafter disclosed, and the scope of the invention will be indicated in the claims.

It has been found that denitration of nitrocellulose does not proceed uniformly or sufficiently rapidly if the product is dried before denitration and in a dry condition when introduced into the reducing solution. According to the present invention the reduction of the nitrocellulose proceeds smoothly, uniformly and rapidly if the reaction is carried out while the product is in a swollen gel state by reason of containing a substantial quantity of a suitable swelling agent for the nitrocellulose.

If the product is produced by coagulation with a liquid coagulant, the best results are obtained by maintaining the product in the wet gel state from the time of coagulation to the time of denitration. For example, if nitrocellulose dissolved in ether and ethyl alcohol is coagulated or set by means of water, the water diffuses into the product and forms with the residual alcohol and ether a suitable swelling agent and maintains the product in the gel state. If the product is produced by a "dry spinning" process, such as by extrusion into a gaseous atmosphere, the residual solvents may be evaporated and the product thereafter treated with a suitable swelling agent to place it in the swollen gel state desired for denitration.

As swelling agents there may be employed liquids which are not solvents of the nitrocellulose, such, for example, as pure ethyl alcohol, diethylene glycol, and the like, or there may be employed a swelling agent comprising a mixture of an active nitrocellulose solvent such, for example, as methyl alcohol, acetone, butyl acetate and the like, in admixture with a suitable diluent nonsolvent such as water, glycerine, ethylene glycol, hydrocarbons and the like in such proportions that the mixture will swell but not dissolve the nitrocellulose.

When a single substance will both coagulate and swell the nitrocellulose, it is desirable to utilize a concentration of the said substance in a single bath such that coagulation and swelling can take place simultaneously in such bath. When one substance is required to coagulate the cellulose nitrate and a different substance is required to swell the material, these substances may be employed in the same bath when they are miscible to simultaneously coagulate and swell the cellulosic material, or the coagulating agent may be employed in one bath and the swelling agent in a separate bath in particular if these agents are not miscible.

For example, the following are suitable mixtures for use as swelling agents for nitrocellulose in the process of the invention, the water being based on the weight of the solvent:

(a) monoethanolamine with above 15% water,
(b) acetone with 60-70% water,
(c) Diethylene oxide sold under the trade-name "Dioxan" with above 45% water.
(d) Glycol monomethyl ether sold under the trade-name "Methyl Cellosolve" with above 60% water,
(e) Diethylenimide sold under the trade-name "Morpholine" with above 40% water,
(f) glacial acetic acid with above 10% water,
(g) methyl alcohol with 15-30% water.

It is to be understood that the denitration is carried out while the product is swollen and in the gel state and, even if the product has been predried, the dried product is treated with a suitable swelling agent, for example one of those disclosed above, and then subjected to denitration.

It has now been discovered also that the swelling agents which facilitate the denitration likewise greatly facilitate stretching the nitrocellulose product. The stretching in the present invention is carried out after substantially complete coagulation but prior to denitration and while the product is in the swollen gel state. For example, if filaments of nitrocellulose are placed in a swollen gel state, as herein disclosed, and subjected to a substantial longitudinal stretching between coagulation and denitration, their tensile strength in both the wet and the dry state is greatly increased and their shrinkage substantially diminished. The stretched structure of the product is fixed by denitration in accordance with the present invention.

The process of the invention is applicable for the denitration of the various elongate products made from nitrocellulose such, for example, as filaments, films, bands, tubing, casings, coatings, and yarn, thread, fabrics, etc., made of or containing nitrocellulose filaments. The term "filaments" is intended to include artificial horsehair and artificial silk either in the form of continuous filaments or cut staple fibre. The expression "films" is intended to include photographic and motion picture films. The expression "casings" covers seamless tubing adapted for use in the packaging of sausage food paste, ice cream, candles and for covering and packing various objects.

For the reducing agent there may be employed any suitable water-soluble alkali hydrosulphide such, for example, as calcium, sodium, potassium or ammonium hydrosulphide. With respect to the denitrating solution, other reducing substances known in the art such as ferrous chloride, stannous chloride, formaldehyde, etc. may be substituted for part or all of the alkali-hydrosulphide. The hydrosulphide is preferably used in conjunction with a suitable catalyst such, for example, as a small amount of free ammonia or sodium sulphide, the dispersion medium being water or a mixture of water and a swelling agent of the nitrocellulose such, for example, as ethyl alcohol, diethylene glycol, and the like.

Instead of employing a high concentration of the reducing agent as in the practice heretofore, the present invention employs the reducing agent in a relatively low concentration such, for example, as from 5 per cent to 4.25 per cent, depending upon the temperature. With this concentration of the hydrosulphide, the products can tolerate without harmful results sodium polysulphide in a range from 3 per cent to 1.75 per cent of the solution. For example, at a temperature of 5° C. the sodium hydrosulphide may be 3 per cent and the sodium polysulphide may be 3 per cent, while at a temperature of 18° C. the sodium hydrosulphide may be 4.25 per cent and the sodium polysulphide may be 1.75 per cent. The temperature at which the reducing treatment is carried out may be varied with a wide range, depending upon the mass of the product being treated, the concentration of the reducing agent and the time of contact with the reducing solution. In the now preferred embodiment the temperature employed is not substantially greater than 20° C., preferably from 10° to 15° C.

In the now preferred embodiment of the process, the nitrocellulose products are passed continuously into contact with a reducing agent in solution in such a manner that the products are not subjected to any substantial degree of stretching or tension during denitration. For example, the nitrocellulose product is continuously passed through a bath containing a solution of a reducing agent, the bath having means for obtaining a long time of contact between the treating solution and the products. For example, where the products are in the form of elongate bodies such, for example, as continuous filaments, films, bands, tubes, casings and the like, the products may be passed through a vessel provided with a plurality of rollers adapted to cause the products to travel in a sinuous path, the rollers being suitably driven so as to avoid subjecting the product to substantial tension or stretching. Alternatively, the product may be carried through the treating bath while supported on a suitable rack which causes the product to be festooned. Preferably the flow of the reducing solution is concurrent with the flow of the materials through the treating bath so that the solution tends to move the product forward rather than to exert tension thereon.

According to the nature and intended use of the product, the nitrocellulose may be superficially, substantially or completely denitrated whereby the nitro groups are decomposed and the cellulose ester converted to cellulose hydrate. As the reaction proceeds, fresh quantities of the reducing agent may be continuously or intermittently added to the circulating reducing solution so as to maintain the concentration of the reducing agent. After denitration has proceeded to the desired point, the product may be washed and soured with a dilute mineral acid, to remove any iron sulphide, after which the product may, if desired, be bleached, dyed, delustered, soaped, washed, dried and softened in a known manner.

By way of illustration, but not by way of limiting the invention, there may be given the following examples of the application of the present process.

1. A solution of nitrocellulose in a suitable solvent such, for example, as a mixture of ether and ethyl alcohol is extruded through a spinnerette into a coagulating bath containing water and a small proportion of ethyl alcohol, the contact with the coagulating bath being sufficient to set up a definite micelle structure in the nitrocellulose product. The mixture of ethyl alcohol and water will maintain the product in the gel state. Thereafter, the artificial filaments are denitrated while in the swollen gel state by passing the filaments continuously through a bath comprising 3.75 per cent sodium hydrosulphide, 1.75 per cent sodium polysulphide and water at a temperature of 13° C., the denitrating solution being continuously circulated concurrently with the filaments. The denitrated filaments are washed, treated with hot dilute hydrochloric acid and thereafter finished in a known manner.

2. A suitable film-forming dope comprising nitrocellulose, a plasticizer and a solvent is cast upon a heated drum and the solvent evaporated to form a self-supporting film. The film is stripped from the drum and passed continuously through a bath comprising a mixture of water and acetone of sufficient concentration to swell but not to dissolve the film. The film in the swollen gel state is then passed continuously through a denitrating bath comprising 3.75 per cent sodium hydrosulphide and 1.75 per cent sodium polysulfide, maintained at a temperature of 15° C., the traverse being sufficient to denitrate the film to the required extent. The denitrated product is finished in a conventional manner.

3. A suitable tube-forming dope comprising nitrocellulose dissolved in a mixture of ether and ethyl alcohol is extruded through an annular orifice into a coagulating bath comprising water. The coagulated tubing is maintained in the wet and swollen gel state by reason of containing the residual alcohol and ether until it is passed continuously through the denitrating solution given in Example 1, the traverse being sufficient to give a product containing less than 2 per cent nitrogen. The product is purified, softened and dried in a known manner.

The process of the invention has many advantages over the processes heretofore known, in that the denitration can be carried out uniformly so that a homogeneous product is produced. Moreover, since the treatment is continuous and the reducing solution continuously circulated there is no opportunity for local overheating of the nitrocellulose, as a result of which one avoids degrading the cellulose and reducing the tensile strength of the products. What is more important, the products are characterized by exhibiting an unusually high tensile strength when wet, as well as a high tensile strength when dry. The wet tensile strength is further improved if the products are stretched after coagulation and before denitration. A further novel characteristic of the products is their extremely low shrinkage upon washing and drying, the shrinkage being less than 2 per cent.

Various changes can be made in the process in the composition of the denitrating solution without transcending the scope of the invention, for example, when making filaments, the filaments may be subjected to various textile operations between the time of formation and the time of denitration such, for example as twisting, doubling, and winding into cakes and yarn packages.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A process for the denitration of an elongate article made of or containing nitrocellulose comprising treating the article with a swelling agent to bring the nitrocellulose into a swollen gel state and thereafter treating the nitrocellulose while in a swollen gel state with a not more than 5.0 per cent solution of alkali hydrosulphide at a temperature not substantially greater than 20° C.

2. A process of producing an article from nitrocellulose comprising shaping a solution of nitrocellulose in a suitable solvent into the form of the article, coagulating the nitrocellulose to set it in the shape of the article while maintaining the nitrocellulose in a swolen gel state, and subjecting the nitrocellulose of the article while it is still in the swollen gel state from the coagulating operation to a denitrating operation.

3. The process of producing an article made of or containing nitrocellulose comprising shaping a solution containing nitrocellulose in a suitable solvent into the form of the article, subjecting the shaped article to the action of a coagulating liquid to set the nitrocellulose while retaining a sufficient residual quantity of said solvent in said nitrocellulose to cooperate with the coagulating liquid in maintaining the nitrocellulose in a swollen gel state, and subjecting the nitrocellulose while it is still in the swollen gel state from the coagulating operation to a denitrating operation.

4. The process of producing an elongate article made of or containing nitrocellulose comprising shaping a solution containing nitrocellulose in a suitable solvent into the form of the article, subjecting the shaped article to the action of a coagulating liquid to set the nitrocellulose while retaining a sufficient residual quantity of said solvent in said nitrocellulose to cooperate with the coagulating liquid in maintaining the nitrocellulose in a swollen gel state, and passing the article continuously into contact with a reducing agent while the nitrocellulose of the article is still in the swollen gel state from the coagulating operation.

5. The process of producing an article made of or containing nitrocellulose comprising shaping a solution containing nitrocellulose in a suitable solvent into the form of the article, subjecting the shaped article to the action of a coagulating liquid to set the nitrocellulose while retaining a sufficient residual quantity of said solvent in said nitrocellulose to cooperate with the coagulating liquid in maintaining the nitrocellulose in a swollen gel state, and subjecting the nitrocellulose while it is still in the swollen gel state from the coagulating operation to a denitrating operation without subjecting the article to substantial tension.

6. The process of producing an aricle made of or containing nitrocellulose comprising shaping a solution containing nitrocellulose in a suitable solvent into the form of the article, coagulating the nitrocellulose to set it in the shape of the article while maintaining the nitrocellulose in a swollen gel state, thereafter stretching the nitrocellulose of the article and then subjecting the nitrocellulose while it is still in the swollen gel state from the coagulating operation to a denitrating operation.

FRANK H. REICHEL.
AUGUSTUS E. CRAVER.